March 29, 1960  L. H. CARL ET AL  2,930,207
HEATER CLAMPING ASSEMBLIES
Filed Dec. 2, 1957  3 Sheets-Sheet 1
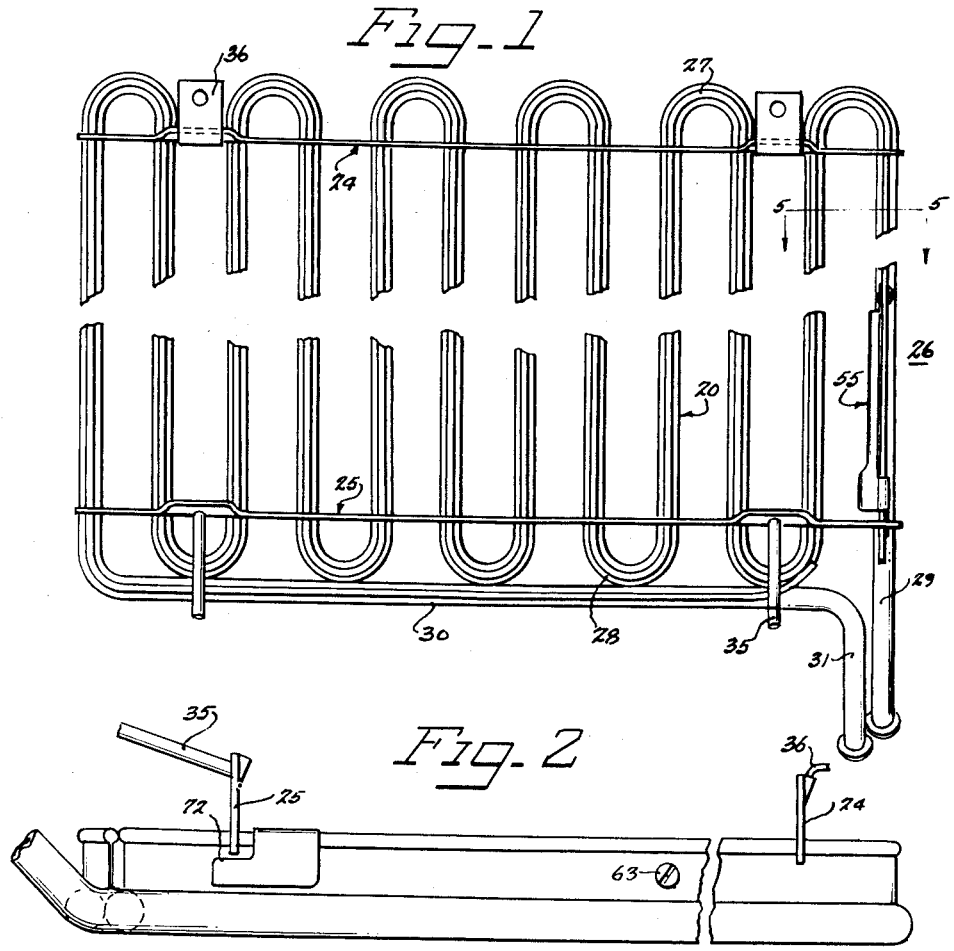
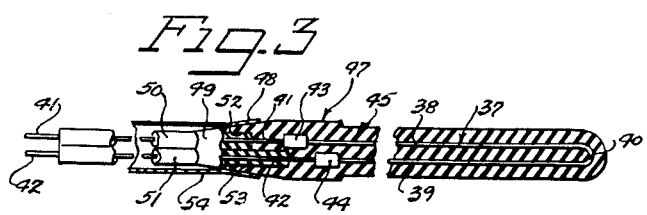
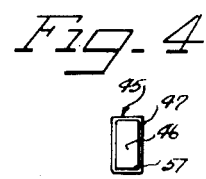
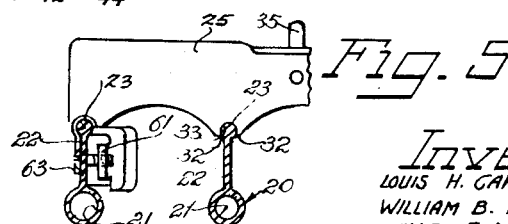
Inventors
LOUIS H. CARL
WILLIAM B. HERNDON JR.
GENE F. McCONNELL
By Robert H Wendt Atty

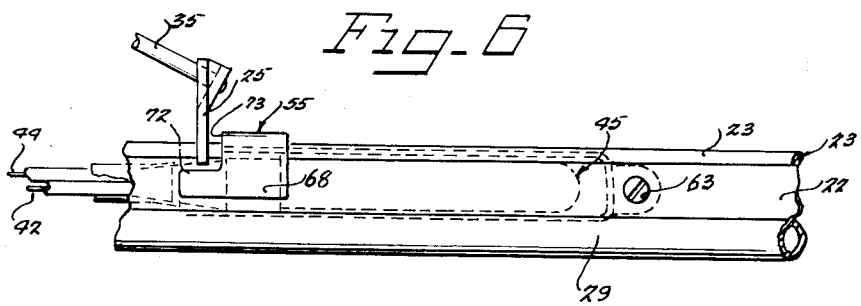
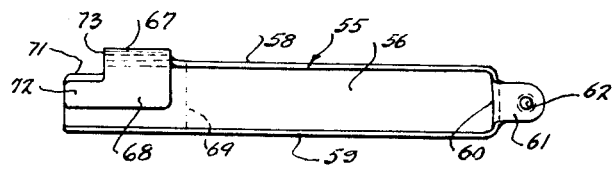
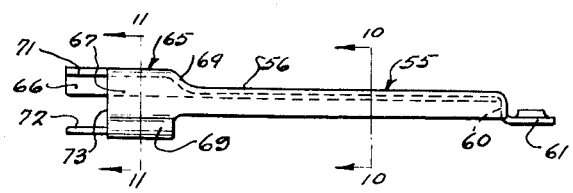
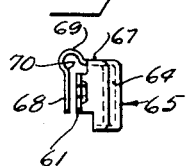
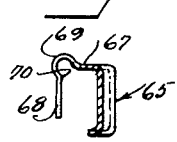
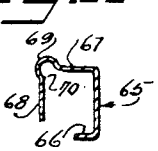

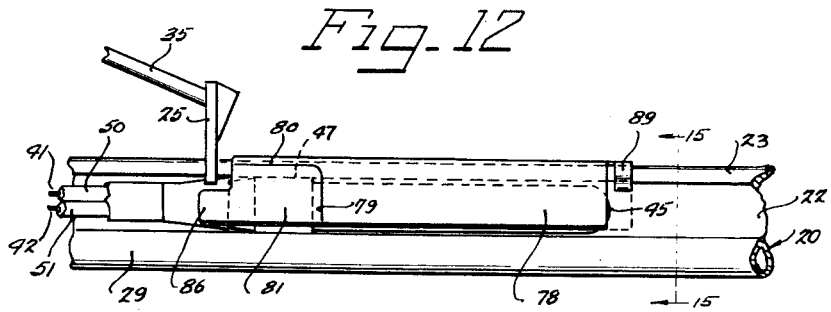
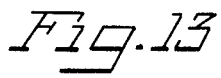
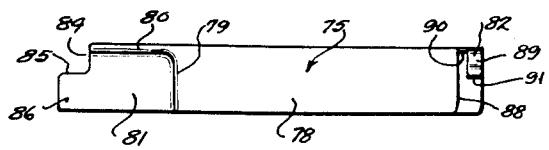
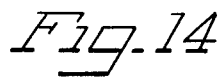
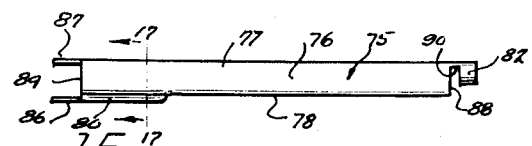
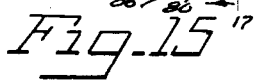
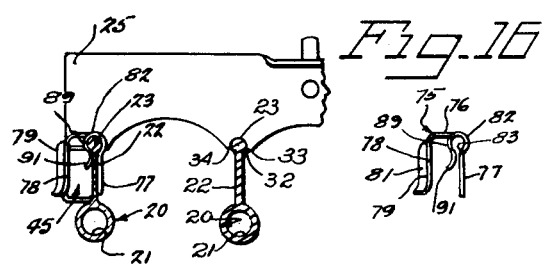
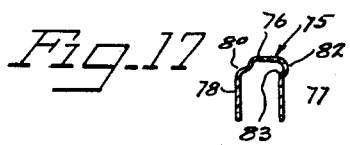
Inventors
LOUIS H. CARL
WILLIAM B. HERNDON JR
GENE F. McCONNELL
By Robert H Wendt Atty United States Patent Office 2,930,207
Patented Mar. 29, 1960

2,930,207

HEATER CLAMPING ASSEMBLIES

Louis H. Carl, William B. Herndon, Jr., and Gene F. McConnell, Evansville, Ind., assignors to Whirlpool Corporation, St. Joseph, Mich., a corporation of Delaware Application December 2, 1957, Serial No. 700,122

9 Claims. (Cl. 62—276)

The present invention relates to evaporator heater clamping assemblies, and is particularly concerned with improvements in defrosting evaporators, relating to the securement of a defrosting heater on the evaporator.

One of the objects of the invention is the provision of an improved evaporator heater and clamp assembly by means of which the evaporator is provided with a heater which is quickly attachable and quickly detachable from the evaporator and readily accessible for service and by means of which the heater is provided with a maximum heat conducting engagement with the evaporator and with the clamp for transmitting heat from the heater to the evaporator.

Another object of the invention is the provision of improved evaporator-heater-clamp assemblies in which the heater is readily secured in a detachable manner by means of a resilient clamp that may be pressed over the evaporator rib and heater in such manner that the clamp is automatically retained on the rib and automatically secures the heater to the rib of the evaporator.

Another object of the invention is the provision of an improved heater clamp for securing a heater to an evaporator in which the clamp is provided with a longitudinally extending securing member for engaging under the frame of the evaporator at one end and is provided at the other end with a resilient clamping structure that so engages a bead on the evaporator rib that the heater is brought into maximum heat engaging contact with the rib carried by evaporator coils and so that this type of clamp may be secured by means of a single screw bolt.

Another object of the invention is the provision of an improved evaporator and heater assembly in which the heater is readily removable, being secured by a resilient clamp that engages over the heater and over a rib carried by the evaporator in such manner that the clamp is positively secured, but is readily removable and accessible for service or replacement.

Another object of the invention is the provision of an improved evaporator-heater-clamp assembly in which the heater is covered with silicone rubber from end to end and in which the entire heater, including the junction, is covered by the clamp, giving a maximum heat conducting engagement between heater, clamp, and evaporator.

Another object of the invention is the provision of an improved heater securing clamp which is adapted to be used to secure a rubber covered heater to an evaporator of the type having a longitudinally extending rib and bead on the evaporator tube and in which the bead is utilized to be gripped by a resilient clamp, securing the heater, while the clamp is also secured against removal by engaging under a transverse frame part of the evaporator.

Other objects and advantages of the invention will be apparent from the following description and the accompanying drawings, in which similar characters of reference indicate similar parts throughout the several views.

Referring to the drawings, of which there are three sheets,

Fig. 1 is a top plan view of an evaporator of the sinuous type, which is employed in the above-freezing food compartment of a household refrigerator, the evaporator being tilted downwardly from front to back for drainage of condensate;

Fig. 2 is a side elevational view shown in the horizontal position for saving space;

Fig. 3 is a side elevational view in partial section on an axial plane of a rubber covered heater used for aiding the defrost of the evaporator;

Fig. 4 is an end view of the heater, taken from the right end of Fig. 3;

Fig. 5 is a fragmentary sectional view taken on the plane of the line 5—5 of Fig. 1, looking in the direction of the arrows;

Fig. 6 is a fragmentary side elevational view of the inlet portion of the evaporator tubing, showing the electric heater applied thereto by a preferred form of heater clamp;

Fig. 7 is a side elevational view of the heater clamp of Fig. 6;

Fig. 8 is a top plan view of the heater clamp of Fig. 6;

Fig. 9 is an end elevational view, taken from the right end of Fig. 7;

Fig. 10 is a sectional view taken on the plane of the line 10—10 of Fig. 8, looking in the direction of the arrows;

Fig. 11 is a sectional view taken on the plane of the line 11—11 of Fig. 8, looking in the direction of the arrows;

Fig. 12 is a fragmentary side elevational view of the inlet tubing of an evaporator carrying a modified form of heater clamp for securing the same kind of heater to the evaporator;

Fig. 13 is a side elevational view of the heater clamp of Fig. 12;

Fig. 14 is a top plan view of the heater clamp of Fig. 13;

Fig. 15 is a fragmentary sectional view of the evaporator taken on the plane of the line 15—15 of Fig. 12, looking in the direction of the arrows;

Fig. 16 is an end elevational view of the heater clamp, taken from the right end of Fig. 13;

Fig. 17 is a sectional view taken on the plane of the line 17—17 of Fig. 14, looking in the direction of the arrows.

Referring to Figs. 1 and 2, the present heaters and heater clamp assemblies are particularly adapted to be used with evaporators of the type having a multiplicity of sinuous passes of tubing, which is provided with an integral longitudinally extending rib having a bead at its upper edge.

For example, the type of tubing is shown in section in Fig. 5, where the tubing is indicated by the number 20, having a continuous bore 21, and having a wide integral rib 22 extending radially and longitudinally from one side of the tube 20.

The rib 22 is provided at its outer edge with an integral longitudinally extending bead 23, which may be circular in cross-section, and which is used for securing the tubing at a multiplicity of points to the transverse frame members 24 and 25 (Fig. 1) which hold the evaporator and are used to mount it on the liner of the compartment in which it is installed.

For example, the evaporator is indicated in its entirety by the numeral 26; and it comprises a multiplicity of straight passes 20 of such tubing joined by integral U-shaped bends 27 and 28 into a sinuous assembly extending from the inlet end 29 of the evaporator to the opposite end, where the tubing is integrally joined to a transversely extending pass 30 leading to the outlet 31.

Each of the transverse frame members 24 and 25 comprises a sheet metal strip of rectangular shape provided with a multiplicity of circular grooves 33 (Fig. 5) of sufficient size to receive the beads 23, which are located in these grooves and are covered for more than 180 degrees by the walls of the groove 33 in each case, so that the portions 32 and 34 on either side of the groove 33 may be riveted over or staked into permanent engagement with the rib 23 in each groove.

The frame members 24 and 25 are provided with rigid pins 35 in the latter case and with a transversely extending bracket 36 in the former case for attachment to the liner of the compartment.

The heaters which are utilized with these evaporators are of the type shown in Fig. 3, in which there is a U-shaped wire 37 having its legs 38 and 39 extending parallel to each other from the U-shaped portion 40; and the legs 38 and 39 are joined to lead wires 41, 42 at the junctions 43, 44.

The entire heater, including the junctions, is covered with a molded rectangular body 45 of silicone rubber, which insulates the heater wire from all surrounding parts and protects it against short circuiting and is also adapted to conduct the heat from the wire to the clamp and to the evaporator.

The body 45 of the heater is substantially rectangular, as seen at its end 46 in Fig. 4; and it is provided with an enlargement 47, also rectangular, about the junctions 43 and 44. The heater body is tapered at 48 to a minimum size at 49, where the rubber insulation 50 and 51 covers the two lead wires 41 and 42; and the rubber extends into bores 52 and 53 in the heater body 45 to establish a water-tight connection between the rubber insulation 50, 51 of the lead wires and the rubber heater body 45.

A vinyl sleeve 54 is located tightly on the lead end of the heater and covers the moisture-proof connection between the heater lead insulation 50, 51 and the heater body 45.

The heater is connected in such manner that it is energized when the compressor is de-energized, so that the heater tends to assist the defrosting action of the evaporator, which is operated on a defrosting cycle, reaching a temperature above freezing during the off part of each cycle, so that the frost is melted off.

Referring to Fig. 1, the preferred form of heater clamp is indicated by 55 in this view, showing the clamp applied to the inside of the right pass at the inlet of the evaporator 26 in Fig. 1 (without the heater).

Referring to Figs. 6–11, these are views showing the preferred type of heater-clamp assembly and the clamp per se.

In Fig. 6 the heater clamp 55 is shown on the tube 29 with its rib 22 and bead 23; but the heater and clamp are on the inside of this evaporator pass, and therefore appear in dotted line. The heater is indicated by its body 45 and its leads 41, 42; and the body 45 is pressed against the back side of the rib 22 in Fig. 6 by the clamp 55, which fits over the bead and rib and over the heater, enclosing the heater practically from end to end.

For this purpose the clamp 55 is provided with a flat metal body 56 which engages the plane side 57 of the heater at its smallest portion; and the body 56 of the clamp preferably has an over-hanging flange 58 at its top and an underlying flange 59 at its bottom, forming a channel for receiving the heater body 45.

This channel 56, 58, 59 has an end wall 60, all of these parts being formed by stamping or pressing the clamp out of sheet metal; and the end wall 60 supports a longitudinally extending tab 61, which is formed with a threaded bore 62 for receiving a screw bolt 63 by means of which this end of the clamp is secured to the rib 22.

For example, in Fig. 5 the rib 22 of the right hand pass has a through bore for receiving the shank of screw bolt 63, which extends to the tab 61, where it is threaded into the bore 62, drawing this end of the clamp 55 toward the rib 22 and clamping the heater at this end.

The heater body 45 has an enlargement 47, and therefore the clamp 55 has an offset 64 in its body 56; and the offset 64 leads to an enlarged channel portion 65 in which the lower flange 66, which is located below the heater, is wider than the underlying flange 59.

This enlargement is of substantially U shape, having an upper yoke 67, which extends over the heater body 45, and having a depending flange 68 on the other side of the rib 22 for drawing this end of the heater against the rib 22.

In order to accommodate the bead 23 the U-shaped formation at the enlargement 65 is formed with a partially cylindrical portion 69 between the depending flange 68 and the top flange or yoke 67 (Fig. 9) so that this portion of the clamp 55 fits the assembly of the heater and evaporator tube with its rib and bead. The bead fits inside the partially cylindrical portion 69 (Fig. 9); and the flange 68 extends over, below the bead 23 at the point 70, resisting the removal of the clamp from the bead, which is resiliently clamped.

The enlargement 65 is cut away at 71 (Fig. 8); and the depending flange 68 is cut away at 72 to the end line 73 on the yoke 67 so that the clamp has two forwardly projecting upper surfaces 71 and 72, one of which may be seen in Fig. 2 at 72 located under the frame member 25 and preventing the removal of the clamp at this end except by first removing the screw bolt 63. Thus a single threaded member assures the tight securement of this readily removable clamp on the evaporator coil.

The mode of attachment is as follows: The heater is placed inside the clamp and the clamp is pressed over the top of the bead and rib and then slid laterally to the position of Fig. 6 into registry between the threaded bore 62 and the screw bolt 63. The screw bolt is then threaded into the bore 62, placing clamping action on the heater body 45.

Maximum heat conducting contact is provided between the heater and the rib, between the heater and the clamp, and between the clamp and the bead and rib, so that the heat generated can be readily conducted to the evaporator tubing, where it heats the refrigerant, passing in at the inlet during the defrost cycle to vaporize the refrigerant and to effect a quicker defrost.

Referring to Figs. 12–17, these are views similar to Figs. 6–11, showing the application of a modified form of clamp to the heater and evaporator. The same numerals are applied to the heater and the evaporator; but the modified clamp is indicated in its entirety by the numeral 75.

This clamp comprises a resilient sheet metal member preferably made of aluminum like the clamp 55; and the clamp 75 is of substantially U shape throughout the major portion of its length. In this case the clamp is disposed on the outside of the inlet pass of the evaporator opposite to the location of clamp 55 in Fig. 1, as shown in Fig. 12.

The clamp 75 being of substantially U shape, it has an upper yoke 76 and two depending resilient flanges 77, 78. The flanges 77, 78 are parallel; and the flange 78 engages the side of the heater body 45, while the flange 77 engages the other side of the rib 22.

The flange 78 is provided with an offset 79 and an offset flange 80, forming an enlargement flange 81, which provides a wider space in the U-shaped clamp for accommodating the enlargement 47 of the heater. The yoke 76 of clamp 75 is also suitably shaped to accommodate the bead 23; and for this purpose the yoke 76 extends up and over the bead 23 and has a partially cylindrical formation 82 (Fig. 17) fitting about the bead and extending slightly below the bead 23.

This provides a shoulder 83 (Fig. 17) on the clamp for engaging below the bead to retain the clamp on the bead.

At its left end the clamp has its yoke and part of its side flanges cut away at 84 and 85 with an angular cut to provide the forwardly extending flange portions 86, 87 on each side of the clamp at that end to extend under the frame member 25 of the evaporator.

At its right end clamp 75 has the flange 78 cut away at 88, leaving a depending tab 89 spaced by a groove 90 from the end 88 and carried by the cylindrical formation 82 of the clamp that extends about the top of the bead. The tab 89 continues to extend about the bead from 82 and downward on the inside of the bead, where it is bent outward at 91, forming a camming portion, which permits the bead to cam apart the tab 89 and the flange 77 at 90 to force the bead into the groove that is provided on the clamp for the bead.

Thus the right end of the clamp in Fig. 12 has a resilient retaining tab that may be forced over the bead to retain this end of the clamp on the bead and evaporator tube.

The method of application of the clamp to the heater and evaporator is as follows:

The heater body 45 is placed against the outside of the rib 22; and the clamp 75 has its legs or flanges 77, 78 forced down over the heater body 45, rib 22, and bead 23 at the left end. The clamp and heater assembly is then slid to the left in Fig. 12 until the flanges 86, 87 are under the frame member 25, where the cut-out edge 85 engages the bottom of frame member 25. This assures the retention of the clamp and heater on the evaporator at this end.

The other end of the clamp 75 has its resilient tab 89 forced down around the bead 23, where it is retained on the bead 23 by the tab 89 to secure the clamp on the evaporator tube at this end.

In this case also the heater clamp extends substantially over the full length of the heater, holding the heater body against the rib 22 with maximum heat engaging contact between the rib and the heater and also between the clamp and the heater.

The clamp also has maximum heat conducting engagement with the rib 22 at the flange 77; and the heat generated by the heater is readily conducted to the evaporator to heat the refrigerant passing in at the inlet of the evaporator.

It will thus be observed that we have invented a plurality of forms of heater clamps used for clamping an electric heater in heat conducting contact with the evaporator tubing of the type having a tube with an integral radial rib and an integral head on the edge of the rib.

The evaporator-heater-clamp assemblies are readily removable and conveniently accessible for repair or replacement; and they facilitate the quick defrosting of the evaporator on the off cycle of the compressor by applying heat to the inlet of the evaporator. The heater-clamp assemblies are simple in construction, they include a minimum number of parts, they may be economically manufactured, and they may be used on all kinds of evaporators utilizing tubing of this shape.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a refrigerating device including an evaporator having a refrigerant containing portion and a flange in heat transfer relationship with the refrigerant containing portion, means for securing a heating element in heat transfer relationship with said evaporator, comprising a clamp provided with spaced apart legs arranged to have one leg abut one side of the flange and the other leg abut the heating element to clamp the heating element against the other side of the flange, means at one end of the clamp arranged to prevent movement of said one end from the flange when the clamp is in one position longitudinally of the flange and to permit removal of said one end from the flange when the clamp is in another position longitudinally of the flange, and means at the other end of the clamp for securing said other end of the clamp to the flange with said clamp in said one position.

2. The refrigerating device of claim 1 wherein said means at the other end of the clamp comprises a spring clip frictionally engaging the flange.

3. The refrigerating device of claim 1 wherein said means at the other end of the clamp comprises threaded fastening means for positively securing said other end to the flange.

4. In a refrigerating device including an evaporator having a refrigerant containing portion and a flange in heat transfer relationship with the refrigerant containing portion and a support for the evaporator, means for securing a heating element in heat transfer relationship with said evaporator, comprising a clamp provided with spaced apart legs arranged to have one leg abut one side of the flange and the other leg abut the heating element to clamp the heating element against the other side of the flange, means at one end of the clamp positioned to engage the support to prevent movement of said one clamp end away from the flange when the clamp is in one position longitudinally of the flange, and means at the other end of the clamp for securing said other end of the clamp to the flange with said clamp in said one position.

5. In a refrigerating device including an evaporator having a refrigerant containing portion and a flange in heat transfer relationship with the refrigerant containing portion and a support for the evaporator, means for securing a heating element in heat transfer relationship with said evaporator, comprising a clamp provided with spaced apart legs arranged to have one leg abut one side of the flange and the other leg abut the heating element to clamp the heating element against the other side of the flange, a portion extending between said legs to overlie the flange, means at one end of the clamp arranged to underlie the support to retain said clamp portion adjacent the flange, and means at the other end of the clamp for removably securing said other end of the clamp to the flange.

6. The refrigerating device of claim 5 wherein the flange is provided with a longitudinally extending outer bead, and said portion of the clamp includes a complementary longitudinally extending part retained against said bead.

7. In a refrigerating device including an evaporator having a refrigerant containing portion, and a flange extending substantially longitudinally of the refrigerant containing portion, means for securing an elongated heating element in heat transfer relationship to said evaporator comprising a clamp provided with spaced apart legs arranged to have one leg abut one side of said flange and the other leg abut the heating element to clamp the heating element against the other side of the flange, a retaining portion on said other leg arranged to bear against the side of the heating element and urge the heating element against said other side of the flange over a substantial portion of the heating element, a securing portion on said clamp arranged to be disposed beyond the heating element, and means for securing the securing portion to the flange of the evaporator.

8. The refrigerating device of claim 7 wherein the flange of the evaporator is provided with an opening and the means for securing the securing portion of the clamp to the flange of the evaporator comprises an element passed through said opening and engaging said securing portion.

9. In a refrigerating device including an evaporator having a refrigerant containing portion, a flange extending from the refrigerant containing portion, and a bead on the outer end of the flange, means for securing an elongated heating element in heat transfer relationship to said evaporator, comprising a clamp provided with spaced apart legs arranged to have one leg abut one side of said flange and the other leg abut the heating element to clamp the heating element against the other side of the flange, and a clip on one end of the clamp for gripping engagement with the bead on the evaporator flange to secure the clamp at said end to the evaporator.

References Cited in the file of this patent

UNITED STATES PATENTS

| | | |
|---|---|---|
| 374,948 | Eckert | Dec. 20, 1887 |
| 2,687,023 | Herndon | Aug. 24, 1954 |
| 2,749,717 | Duncan | June 12, 1956 |
| 2,758,150 | Zargarpur | Aug. 7, 1956 |
| 2,819,858 | Mittendorf | Jan. 14, 1958 |